US012770493B2

(12) United States Patent
Sohlberg et al.

(10) Patent No.: US 12,770,493 B2
(45) Date of Patent: Oct. 20, 2026

(54) NOTIFICATION OF A DWELL TIME IN A SET OF AREAS

(71) Applicant: VOLVO TRUCK CORPORATION, Gothenburg (SE)

(72) Inventors: Per Sohlberg, Hovås (SE); Daniel Tegnered, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 214 days.

(21) Appl. No.: 18/427,205

(22) Filed: Jan. 30, 2024

(65) Prior Publication Data

US 2024/0257627 A1 Aug. 1, 2024

(30) Foreign Application Priority Data

Jan. 31, 2023 (EP) .................................... 23154100

(51) Int. Cl.

*G08B 21/18* (2006.01)
*G08B 25/00* (2006.01)
*H04W 4/029* (2018.01)
*H04W 4/46* (2018.01)

(52) U.S. Cl.

CPC ........... *G08B 21/182* (2013.01); *G08B 25/00* (2013.01); *H04W 4/029* (2018.02); *H04W 4/46* (2018.02)

(58) Field of Classification Search

CPC ..... G08B 21/182; G08B 25/00; H04W 4/029; H04W 4/46; H04W 4/021; H04W 4/44; G06Q 10/0631; G06Q 10/08; G06Q 10/047; G06Q 10/08355; G06Q 50/40; G06N 20/00

See application file for complete search history.

(56) References Cited

U.S. PATENT DOCUMENTS

2020/0160708 A1* 5/2020 Kamiya ................. G06V 20/53
2021/0304604 A1 9/2021 Roherty et al.
2023/0022352 A1* 1/2023 Constantine .......... H04W 4/021
2023/0260378 A1* 8/2023 Goossens ............. G06Q 10/083
340/326

OTHER PUBLICATIONS

Extended European Search Report in corresponding European Application No. 23154100.4 dated Jun. 30, 2023 (10 pages).

(Continued)

*Primary Examiner* — James J Yang

(74) *Attorney, Agent, or Firm* — Jeffri A. Kaminski; Venable LLP

(57) ABSTRACT

A computer system comprising a processor device configured to notify of an excessive dwell time is provided. The processor device is configured to obtain a dwell time for at least one area out of a set of areas. The set of areas, including the at least one area, may dynamically change over time based on a time spent within respective locations. The dwell time is indicative of an actual time spent by the at least one first vehicle in the at least one area. The processor device is further configured to, when the obtained dwell time exceeds an expected time by more than a threshold, notify at least one user and/or control unit associated with the set of vehicles.

13 Claims, 6 Drawing Sheets

(56) References Cited

OTHER PUBLICATIONS

Haena Kim et al; "Empirical analysis of commercial vehicle dwell times around freight-attracting urban buildings in downtown Seattle"; Transportation Research Part A vol. 147; 2021; pp. 320-338; 19 pages.

Xingyi Lv et al; "AMBD: Attention Based Multi-Block Deep Learning Model for Warehouse Dwell Time Prediction"; 22nd International Conference on Web Information Systems Engineering, WISE 2021 Melbourne Proceedings; LNCS 13081; pp. 50-66; 17 pages; 2021; https://doi.org/10.1007/978-3-030-91560-5_4; XP093057095.

Extended European Search Report dated Feb. 15, 2024 in corresponding European Application No. 24154749.6, 9 pages.

* cited by examiner

NOTIFICATION OF A DWELL TIME IN A SET OF AREAS

TECHNICAL FIELD

The disclosure relates generally to vehicle time management. In particular aspects, the disclosure relates to notification of a dwell time in a set of areas. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

When vehicles arranged to perform some productive work, e.g., transportation of goods or people, are delayed, productivity is reduced. A delay may for example be caused by other vehicles blocking access to certain areas, e.g., caused by congestion, accidents, unexpected increase in performing certain operations such as loading/unloading times, driver/operator mistakes, etc. Besides directly reducing productivity, delays cause vehicles to have to queue for an extended period without performing any useful work, thereby reducing their efficiency as they are needed to be active without performing any useful work. For example, extended queuing may exhaust a driver of a vehicle and/or waste resources of an autonomous vehicle, even though no productive work is performed.

Hence, there is an ongoing strive to more efficiently handle vehicles operating in the presence of delays.

SUMMARY

According to a first aspect of the disclosure, a computer system comprising a processor device configured to notify of an excessive dwell time in a set of areas is provided.

The processor device is optionally configured to obtain one or more first positions associated with one or more vehicles out of a set of vehicles spending time over a predefined time limit within a respective location, and determine the set of areas based on the one or more first positions. The processor device is configured to obtain a dwell time for the at least one area out of the set of areas. The dwell time is indicative of an actual time spent, by the at least one first vehicle in the at least one area. The processor device is further configured to, when the obtained dwell time exceeds the expected time by more than a threshold, notify at least one user and/or control unit associated with the set of vehicles of that the dwell time exceeds the expected time by more than the threshold.

The first aspect of the disclosure may seek to improve efficiency of the set of vehicles in view of the excessive dwell time. A technical benefit may include a more efficient use of the set of vehicles in the set of areas. This is since when the at least one user and/or control unit associated with the set of vehicles is notified of that the dwell time exceeds the expected time by more than the threshold, the at least one user and/or control unit is enabled to adjust flow of traffic relating to the at least one area accordingly. In some examples, one or more vehicles out of the set of vehicles that are scheduled to travel in the set of areas may be re-routed, and/or the driver of a vehicle out of the set of vehicles can re-schedule to take a scheduled break early, such that the excessive dwell time can be resolved in the meantime. In this way, the vehicles and/or drivers can do useful work and/or take necessary breaks while waiting for the excessive dwell time to be reduced.

Furthermore, since the one or more first positions are obtained due to the one or more vehicles spending time over the predefined time limit within the respective location, a more efficient manner of detecting positions of where vehicle activity is taken place is achieved.

The set of areas and the one or more first positions may dynamically and/or continuously change over time such that the respective determination and obtaining may occur continuously or periodically. A benefit is when this is performed in a dynamic context such as when having a construction site that moves or changed over time. Hence, a manual selection of areas of interest is not needed.

According to a second aspect of the disclosure, a computer-implemented method for notifying of an excessive dwell time in a set of areas is provided. The method optionally comprises, by a processor device of a computer system, obtaining one or more first positions associated with one or more vehicles out of a set of vehicles spending time over a predefined time limit within a respective location and determining the set of areas based on the one or more first positions. The method comprises, by the processor device, obtaining a dwell time for the at least one area out of the set of areas. The dwell time is indicative of an actual time spent, by the at least one first vehicle in the at least one area. The method further comprises, by the processor device, when the obtained dwell time exceeds the expected time by more than a threshold, notifying at least one user and/or control unit associated with the set of vehicles of that the dwell time exceeds the expected time by more than the threshold.

The second aspect of the disclosure may seek to improve efficiency of the set of vehicles in view of the excessive dwell time. A technical benefit may include a more efficient use of the set of vehicles in the set of areas. The technical benefit of the second aspect corresponds to the technical benefit of the first aspect and vice versa.

Examples below are relevant for all aspects, examples, and/or exemplary embodiments herein, including the first aspect of the disclosure and the second aspect of the disclosure.

In some examples, including at least one preferred example, obtaining the one or more first positions comprises detecting that the one or more vehicles out of the set of vehicles have spent over the predefined time limit within a respective radius associated with the respective location. In this way, accurate detection of which locations the set of vehicles have spent more than the predefined time limit can be ensured. This means that the first positions of these respective locations, e.g., center positions of the respective locations, relate to positions of significance to operation of the set of vehicles. The first positions may further be clustered to determine the set of areas.

In some examples, including at least one preferred example, obtaining the one or more first positions comprises detecting that the one or more vehicles out of the set of vehicles have spent over the predefined time limit within the respective location in response to detecting that the one or more vehicles out of the set of vehicles has travelled outside a boundary defining the respective location. The boundary may relate to a diameter of the respective location. In this way, the one or more first positions can be more accurately obtained and the set of areas can therefore be more accurately determined. This allows examples herein to better define areas such as the at least one area where the set of vehicles may dwell, and accordingly, any excessive dwell time therein can be more accurately notified to the at least one user and/or the control unit.

In some examples, including at least one preferred example, optionally, notifying the at least one user and/or control unit associated with the set of vehicles of that the dwell time exceeds the expected time by more than the threshold comprises any one or more out of:

notifying a user and/or control unit of at least one second vehicle out of the set of vehicles of that the dwell time exceeds the expected time by more than the threshold, wherein the at least one second vehicle is scheduled to operate in the at least one area, and notifying a dispatcher of the set of vehicles of that the dwell time exceeds the expected time by more than the threshold, wherein the dispatcher is a user and/or control unit arranged to manage a schedule for the at least one second vehicle.

A technical benefit may include that the drive plan and/or schedule of the at least one second vehicle can be updated based on the excessive dwell time. In some examples, a scheduled break for a driver of the at least one second vehicle can be scheduled earlier to allow for the driver to rest while the dwell time of the at least one area is high. This may allow the dwell time of the at least one area to be reduced, e.g., as fewer vehicles will be travelling into the at least one area. The second vehicle may also be re-routed to do other productive work while the dwell time is high, e.g., be routed to transport goods between, to, and/or from, other areas in the set of areas.

The dispatcher may be a user or a control unit arranged to control the set of vehicles, e.g., to control their respective schedules and/or drive plans. When notifying the dispatcher that the dwell time exceeds the expected time by more than the threshold, the dispatcher is thereby enabled to handle the set of vehicles in a more efficient manner. In some examples, if the dwell time is high, the dispatcher may re-route the at least one second vehicle and/or abort a drive plan at least partially going through the at least one area. This reduces congestion and will eventually bring the dwell time down to a normal level.

In some examples, including at least one preferred example, optionally, notifying the at least one user and/or control unit associated with the set of vehicles of that the dwell time exceeds the expected time by more than the threshold comprises any one or more out of:

notifying the at least one user and/or control unit of the obtained dwell time in the at least one area, and notifying the at least one user and/or control unit of a time difference between the expected time and the obtained dwell time.

A technical benefit may include that the notification can be made in a flexible manner.

In some examples, including at least one preferred example, optionally, notifying the dispatcher of the set of vehicles of that the dwell time exceeds the expected time by more than the threshold comprises notifying the dispatcher that there are too many vehicles operating in, or scheduled to operate in, the set of areas.

A technical benefit may include that the dispatcher can allocate less vehicles to operate in the set of areas to reduce the dwell time and/or to reduce a risk of a high future dwell time.

In some examples, including at least one preferred example, optionally, obtaining the dwell time of the at least one area comprises:

receiving, from the at least one first vehicle, an actual time spent by the at least one first vehicle, when operating in the at least one area.

A technical benefit may include a flexible manner for obtaining the dwell time. This is since the dwell time can be measured, e.g., obtained during an operation of the at least one first vehicle.

In some examples, the method comprises, by the processor device of the computer system, obtaining from a time model for the set of areas, the expected time for at least one first vehicle out of a set of vehicles to spend in at least one area out of the set of areas.

A technical benefit may include a more accurate expected time for vehicles to spend in the set of areas, such as by dynamically changing the expected time based on measured dwell time in the set of areas.

In some examples, including at least one preferred example, optionally, the method further comprises, by the processor device, updating the time model based on the obtained dwell time.

A technical benefit may include a more accurate scheduling of the set of vehicles in the set of areas. This is since the time model will be more accurate when updated with the obtained dwell time.

In some examples, the method further comprises establishing the time model for a respective area in the set of areas, by obtaining one or more dwell times for the respective area, and establishing the time model based on the obtained dwell times. In these examples, the dwell times are respectively indicative of a time spent by one or more vehicles out of the set of vehicles in the respective area.

A technical benefit may include a more accurate time model.

In some examples, including at least one preferred example, optionally, updating the time model based on the obtained dwell time is performed in response to any one or more out of:

a detected change of the set of areas, a predefined time and/or a periodic event, obtaining an indication that a vehicle out of the set of vehicles operates in an area not associated with the time model, detecting that the obtained dwell time for the at least one area is greater than a threshold, and detecting that the obtained dwell time for the at least one area is different from a previously obtained dwell time for the at least one area by more than a threshold.

A technical benefit may include a more accurate scheduling of the set of vehicles in the set of areas. This is since the time model will be more accurate when updated with the obtained dwell time. Furthermore, as the time model is updated when detecting a need, as above one or more options, the time model accuracy is increased further. Furthermore, the time model may update more often to more accurately capture the dynamic changes of the set of areas.

In some examples, including at least one preferred example, optionally, obtaining the expected time is performed by estimating the expected time by using the time model and based on any one or more out of the following input parameters:

a type of the at least one first vehicle, a current time period, e.g., any one or more out of a current date, a current weekday, and/or a current time, a type of at least one object and/or material handled by the at least one first vehicle in the at least one area, an expected time to load and/or unload the at least one first vehicle in the at least one area, an expected mass and/or fill rate associated with the at least one area, a schedule for one or more operations to perform by the set of vehicles in the at least one area, a drive plan of the at least one first vehicle, a number of vehicles of the set of vehicles configured to at least partly operate in the set of areas concurrently as the at least one first vehicle, a number of vehicles of the at least one first vehicle.

A technical benefit may include that the expected time is obtained in a more flexible and accurate manner. This is since the time model can be any suitable model, such as a predetermined model, e.g., a machine learning model, which can be used with a flexible range of inputs which all can be used individually or in any suitable combination to obtain the expected time.

In some examples, including at least one preferred example, optionally, notifying of that the dwell time exceeds the expected time by more than the threshold comprises triggering an adjustment, or an abort, of a drive plan of at least one second vehicle out of the set of vehicles.

A technical benefit may include that the set of vehicles can be handled more efficiently in view of the excessive dwell time. As the drive plan of the at least one second vehicle is adjusted or aborted, the dwell time of the at least one area will be reduced, thereby improving efficiency for vehicles operating therein, and furthermore, the at least one second vehicle can perform other productive work where there is not a high dwell time, or the driver of the vehicle can have a scheduled rest re-scheduled such as to be during the time of the high dwell time.

In some examples, including at least one preferred example, optionally, the method further comprises: by the processor device, guiding at least one second vehicle out of the set of vehicles in the set of areas, based on the estimated dwell time for the at least one area.

Guiding the at least one second vehicle based on the dwell time may include indicating to the at least one second vehicle, or a user of the at least one second vehicle, where to drive, e.g., guiding the at least one second vehicle to one or more areas with a low/short dwell time, e.g., lower than a threshold, and/or guiding the at least one second vehicle to a designated rest area.

A technical benefit may include that the set of vehicles can be handled more efficiently in view of the excessive dwell time. As the at least one second vehicle is guided based on the dwell time, the dwell time of the at least one area will be reduced, thereby improving efficiency for vehicles operating therein.

In some examples, including at least one preferred example, the one or more first positions are obtained during a moving time window. In these examples, the moving time window is a time period of a predefined duration and ranges from a previous point in time to a current point in time.

A technical benefit may include that the one or more first positions are positions where vehicles out of the set of vehicles have recently being positioned, such as recently stopping or recently driving below a speed threshold. Using the moving time window, the set of areas are dynamically adapted to recent movement patterns of the set of vehicles.

In some examples, including at least one preferred example, determining the set of areas is based on the one or more first positions by clustering the one or more first positions to form the set of areas.

A technical benefit may include that the set of areas may be determined to more accurately cover the one or more first positions such as by using a convex hull for forming the set of areas over the one or more first positions.

In some examples, including at least one preferred example, determining the set of areas comprises dynamically updating the set of areas by any one or more out of:

establishing a new area in the set of areas, merging at least two areas in the set of areas, splitting an area into at least two areas in the set of areas, and deleting an area out of the set of areas.

A technical benefit may include that the set of areas may be dynamically updated in a more detailed manner. It follows that dwell time will further be dynamically updated and more accurate in terms of time and place, and as a consequence, it is possible to more accurately notify the at least one user and/or the control unit of excessive dwell time.

According to a third aspect of the disclosure, a vehicle comprising a computer system is provided. The computer system may be the computer system of the first aspect. The computer system may be configured to perform the method of the second aspect. The vehicle may in some examples be at least partly autonomous. The vehicle may in some examples be operated by a user, e.g., a driver of the vehicle. As an alternative, the vehicle may in some examples be remotely controlled. The vehicle may be part of the set of vehicles. The vehicle may be arranged to operate in the set of areas, e.g., the at least one area.

According to a fourth aspect of the disclosure, a computer program product is provided. The computer program product comprises program code for performing, when executed by a processor device, the method of the second aspect.

According to a fifth aspect of the disclosure, a control system is provided. The control system comprises one or more control units configured to perform the method of the second aspect.

According to a sixth aspect of the disclosure, a non-transitory computer-readable storage medium is provided. The non-transitory computer-readable storage medium comprises instructions, which when executed by the processor device, cause the processor device to perform the method of the second aspect.

Technical benefits of the third, fourth, fifth, and sixth aspects may respectively correspond to the technical benefits of the first and/or second aspects.

The above disclosed aspects, examples (including any preferred examples), and/or accompanying claims, may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical benefits.

There are also disclosed herein computer systems, control units, code modules, computer-implemented methods, computer readable media, and computer program products associated with the above discussed technical benefits.

BRIEF DESCRIPTION OF THE DRAWINGS

Examples are described in more detail below with reference to the appended drawings, below follows a more detailed description of aspects of the disclosure cited as examples.

DETAILED DESCRIPTION

Aspects set forth below represent the necessary information to enable those skilled in the art to practice the disclosure.

Figure 1:
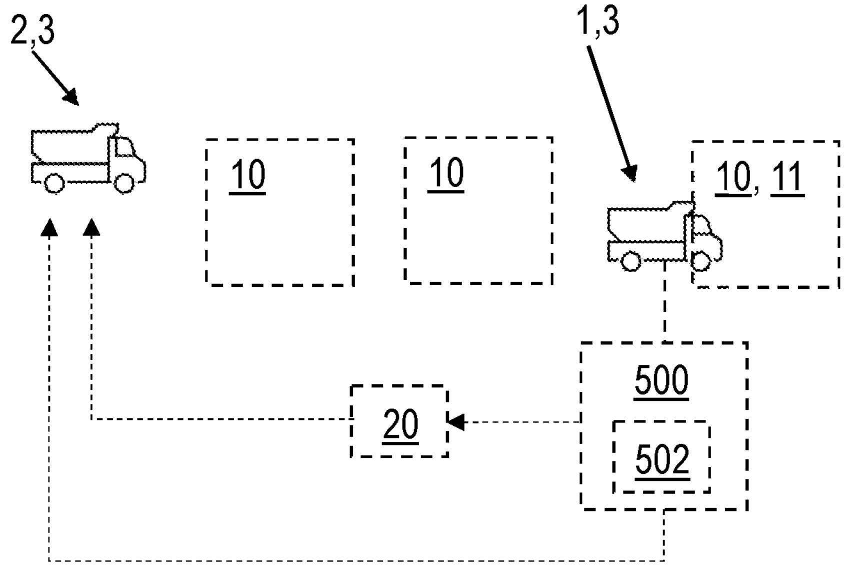
FIG. 1 is an exemplary diagram of a vehicle and a set of areas according to an example.

FIG. 1 is a diagram which illustrate a set of areas 10 according to an example. The set of areas 10 may comprise any one or more suitable sizes of areas, such as course-grained areas, e.g., entire warehouses or work sites, fine-grained areas, e.g., a loading station within a work site, and/or sub-areas within areas of the set of areas 10, etc. In other words, the areas comprising the set of areas are not bound to any specific locations but can be arranged in any suitable manner to cover different locations.

The set of areas 10 may be defined by geo-fences or other geographical or regional restrictions or boundaries. The geo-fences may be used for monitoring dwell time in the set of areas 10. The geo-fences may further be used for determining an operational context of the set of vehicles 3, e.g., it may be detected using the geo-fences where the set of vehicles 3 are operating and possibly associated operations.

The set of areas 10 may dynamically change over time. Typically, the set of areas 10 are defined by how vehicles over time are positioned in respective positions within a predefined radius of respective locations. The respective positions may further form the set of areas 10, e.g., by any suitable clustering technique such as Density-Based Spatial Clustering of Applications with Noise (DBSCAN).

The one or more first positions may be positions where one or more vehicles of the set of vehicles 3 are detected to stop and/or travel slower than a set speed, and/or within a predefined radius of the one or more first positions.

Figure 4A:
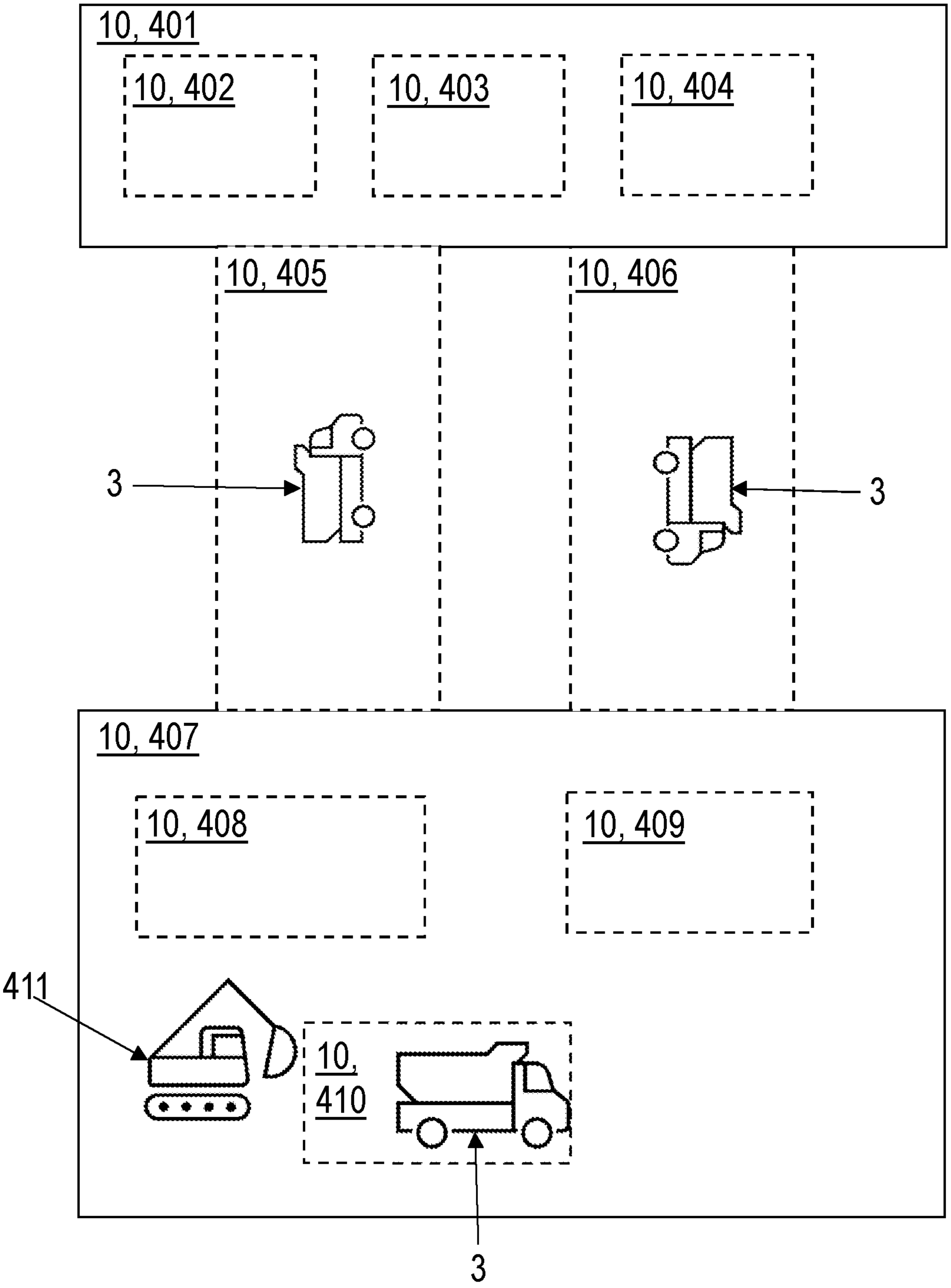
FIG. 4*a* is a block diagram illustrating an example scenario according to an example.
Figure 4B:
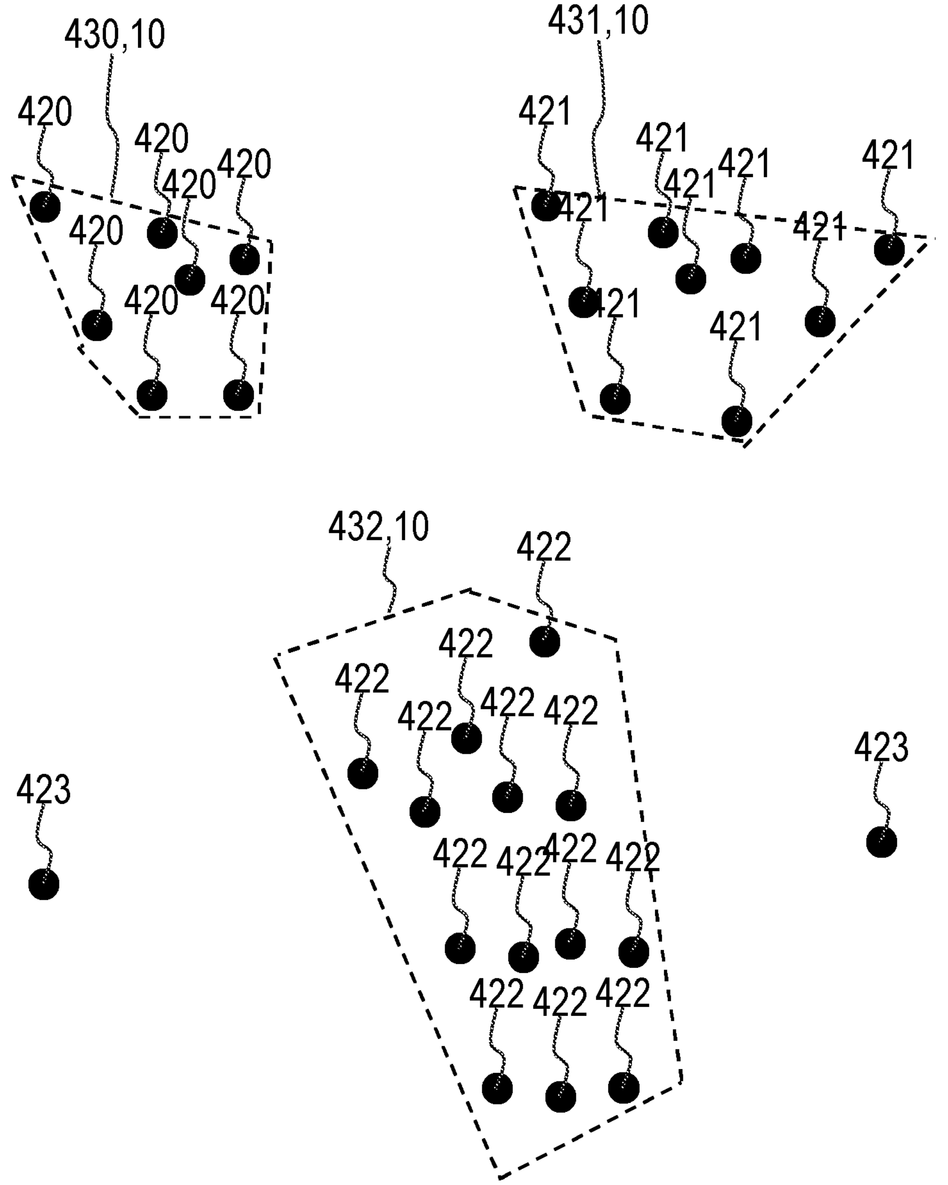
FIG. 4*b* illustrates an example scenario according to an example.
Figure 4C:
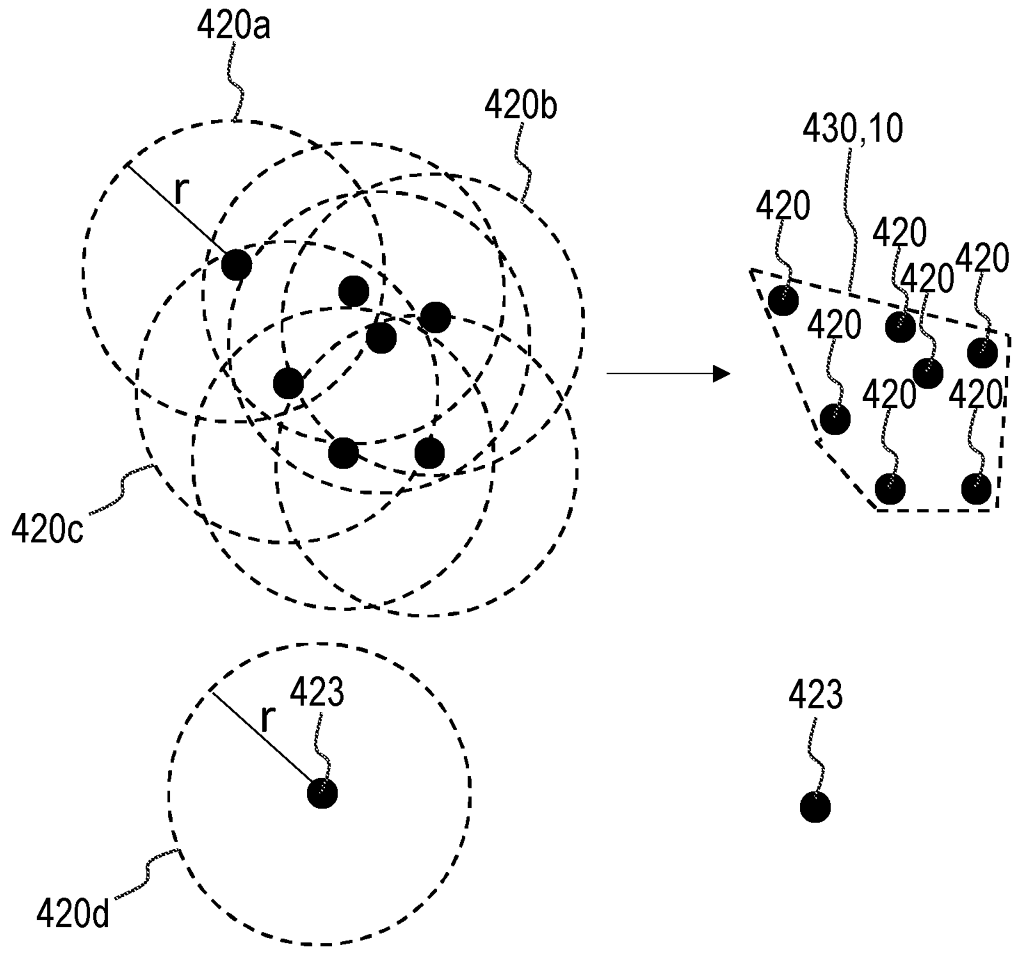
FIG. 4*c* illustrates an example scenario according to an example.

The positions and how they can be clustered to form the set of areas 10 is further exemplified by FIGS. 4*b-c*.

The set of areas 10 may comprise any one or more suitable type of areas, e.g., any one or more out of: loading areas, unloading areas, travelling roads/paths between other areas in the set of areas, queuing areas, maintenance areas, warehouses, and work sites.

In the set of areas 10, a set of vehicles 3 are arranged to operate. The set of vehicles comprises at least one first vehicle 1 and at least one second vehicle 2. Any vehicle within the set of vehicles 3 may respectively be any suitable vehicle such as any of a heavy-duty vehicle, a truck, a bus, and a construction equipment.

In some examples, the vehicles of the set of vehicles 3 are transporting vehicles, transporting goods to, from, and/or between the areas in the set of areas 10. In some examples, each vehicle in the set of vehicles 3 may travel to a loading location in the set of areas 10 for loading the respective vehicle with materials or goods, and then travel to an unloading location in the set of areas 10 for unloading the respective vehicle.

Any one or more vehicle in the set of vehicles 3 may be autonomous, at least partly autonomous, remotely controlled, and/or driven by a user inside the vehicle, i.e. a driver of the vehicle.

In some examples herein, the set of areas 10 may be defined by how the set of vehicles 3 operate. The set of areas 10 may be defined by clustering positions where the set of vehicles 3 drive slowly, e.g., indicative of a work behavior, or where the set of vehicles 3 stop, which may also be indicative of a work behavior of the set of vehicle 3. Typically, the set of areas 10 may be clustered by finding positions of locations where one or more vehicles out of the set of vehicles 3 have spent more than a predefined time limit amount of time. Typically this is performed by detecting that a respective vehicle have travelled a predefined distance corresponding to a diameter or twice of a radius of a respective location, the diameter may be predefined. When the respective vehicle has travelled said diameter, it can be checked if the vehicle spent over the predefined time limit in the location corresponding to the diameter.

In some examples, the at least one first vehicle 1 may be arranged to operate in at least one area 11 out of the set of areas 10. The at least one first vehicle 1 operating in the at least one area 11 may mean that the at least one first vehicle 1 is arranged to transport goods to and/or from the at least one area 11, and/or transports goods between areas in the at least one area 11. In other words, the at least one area 11 may comprise a loading area and/or an unloading area for loading and/or unloading the at least one first vehicle 1. Additionally or alternatively, the at least one first vehicle 1 operating in the at least one area 11 may mean that the at least one first vehicle 1 is arranged to travel through the at least one area 11.

The at least one second vehicle 2 may be arranged to at least partially operate in the at least one area 11, e.g., arranged to travel through and/or transport goods in at least one area out of the at least one area 11. In other words, the at least one second vehicle 2 may be arranged to perform the same loading and/or unloading operations as the at least one first vehicle 1, but at a different point in time. The at least one second vehicle 2 may also be arranged to at least partially operate in the at least one area 11, e.g., at a same or later time than the at least one first vehicle 1.

A schedule for when the at least one second vehicle 2 is operating at least partially in the at least one area 11 may be affected by how long time the at least one first vehicle 1 spends in the at least one area 11. This is since the at least one area 11 may have finite space and/or resources such that only a limited number of vehicles may operate therein at the same time. In some examples, one or more road areas may only be wide enough for one vehicle, loading and/or unloading areas may only be able to load/unload one vehicle at a time. In other words, if the at least one first vehicle 1 experiences a delay when operating in the at least one area 11, then the at least one second vehicle 2 may as a consequence be delayed, and may therefore need to queue for an extended period when operating at least partially in the at least one area 11.

Exemplary embodiments herein may relate to obtaining a dwell time for the at least one first vehicle 1 in the at least one area 11. The obtained dwell time may be an actual time spent in the at least one area 11 or may be predicted, e.g., based on at least some measurements relating to the at least one first vehicle 1 operating in the at least one area 11. The dwell time may further be compared with an expected time, e.g., an expected dwell time for the at least one first vehicle 1 for the at least one area 11, as obtained from a time model.

When the obtained dwell time exceeds the expected time by more than a threshold, at least one user and/or control unit associated with the set of vehicles 3 can then be notified of that the dwell time exceeds the expected time by more than the threshold. In this way, the at least one user and/or control unit can schedule the set of vehicles 3 to account for the excessive dwell time, e.g., by rerouting and/or rescheduling the at least one second vehicle 2.

The time model may be a machine learning model, e.g., a machine learning regressor, or any other suitable statistical model. Establishing the time model may be performed by training the time model based on measurements of the set of vehicles 3 operating in the set of areas 10, e.g., the at least one area 11.

In some examples, to train the time model, data from one or more time periods of the set of areas 10 is obtained. The training data may comprise a dwell time, meaning how long one or more vehicles in the set of vehicles 3 spend in different areas in the set of areas 10. Other time information besides dwell time may also form part of training the time model, e.g., by obtaining time information of how long time the one or more vehicles in the set of vehicles 3 spend performing certain operations in each area out of the set of areas 10, e.g., queueing time, idle time, loading time, unloading time, travelling time, etc.

In some examples, operations performed by the set of vehicles 3 in the set of areas 10 may be represented as a work iteration process, wherein the set of vehicles 3 are scheduled to perform predetermined operations in the set of areas 10, e.g., in a predetermined order or by a predetermined schedule. In some of these examples, training the time model may comprise obtaining the dwell time of each vehicle in the set of vehicles 3, for each of the area in the set of areas 10. The work iteration process may be repeated multiple times for increased accuracy in training the time model.

In some examples, as part of training the time model, one or more positions, e.g., the positions or locations as discussed above, of stopping locations of the vehicles in the set of vehicles 3 may be detected, and may be clustered using any suitable clustering algorithm, e.g., DBSCAN. This may be to detect the extent of the loading and/or unloading areas of the set of areas 10. Stopping locations may be where vehicles completely stop or where they drive below a set speed, e.g., indicating work operations or handling accidents, road events. Stopping locations may also be defined by that the respective vehicles are determined to have spent more time than the predefined time limit. Theses stopping locations may establish the set of areas 10 and/or the at least one area 11 used in exemplary embodiments herein. For each position of the stopping locations, an area in the set of areas 10 and/or in the at least one area 11 may be formed as a boundary by automatically defining the area to be a predefined size, e.g., with a center at the stopping location. The predefined size may be a predefined size larger than a convex hull established from outermost points of the obtained positions of stopping locations, e.g., to decrease a risk of missing detecting future stopping locations if new areas in the set of areas 10 are detected dynamically while employing exemplary embodiments herein. In other words, each area in the set of areas 10 and/or in the at least one area 11 may be established with a location and a size and/or a boundary defining said area.

In some examples, it may be possible to automatically detect whether a vehicle in the set of vehicles 3 is inside an area in the set of areas 10, e.g., inside a boundary of the area, and to further determine time spent in said area, also referred to as dwell time. In some examples, the vehicle may have a positioning sensor, e.g., using a Global Navigation Satellite System (GNSS) such as a Global Positioning System (GPS) which can measure whether it is inside each respective area in the set of areas 10. In fact, in examples herein, all locations or positions of the set of vehicles 3 may be determined based on GPS or GNSS. Examples herein may account for any GPS or GNSS error.

From obtained time information and/or dwell time for the areas in the set of areas 10, the time model may be established, e.g., trained, as a machine learning regressor.

In some examples, the time model may be established based on any suitable training method or available tools for machine learning models, e.g., based on any suitable distributed gradient boosting library such as XGBoost.

In some examples, the time model may be trained such that it can output an expected time to spend in the at least one area 11, e.g., based on any one or more out of: type of the vehicle to operate in the at least one area 11, current status of the at least one area 11, a number of other vehicles operating in the at least one area 11, current date or time, whether or not there are accidents or other delays in the at least one area 11, type of material handled, e.g., transported, in the at least one area 11, and state of congestion in the at least one area 11.

To achieve the above-mentioned output, in a corresponding manner, the time model may be trained by obtaining a time spent by at least one training vehicle, when the at least one training vehicle were operating in the at least one area 11. In some examples, during training of the time model, the obtained time spent may be correlated in the time model with any one or more out of the type of the at least one training vehicle, status of the at least one area 11 when operated by the at least one training vehicle, a number of other vehicles operating in the at least one area 11 when the at least one training vehicle were operating in the at least one area 11, current date or time when the at least one training vehicle were operating in the at least one area 11, whether or not there were any accidents or other delays in the at least one area 11 when the at least one training vehicle were operating in the at least one area 11, type of material handled in, e.g., transported, in the at least one area 11, and state of congestion in the at least one area 11 when the at least one training vehicle were operating in the at least one area 11.

As described above, the set of vehicles 3 may be communicatively coupled with a user and/or control unit arranged to control the respective vehicles, their schedules and/or their drive plans, e.g., when and/or in which areas out of the set of areas 10 the set of vehicles 3 are to operate.

In some examples, a dispatcher 20 may be arranged to manage a schedule for the set of vehicles, including the at least one second vehicle 2. The dispatcher 20 may typically be a person in charge of controlling the schedule for the set of vehicles 3 but may also be a control unit performing these actions in an automated or semi-automated manner. The dispatcher 20 may in some examples be notified of that there is an excessive dwell time in the at least one area 11, e.g., by being notified that the at least one first vehicle 1 is spending a much longer time in the at least one area 11 than what is expected, i.e., an obtained dwell time in the at least one area is greater than an obtained expected time by more than a threshold. The dispatcher 20 may then signal or otherwise notify the at least one second vehicle 2, to be re-routed to other areas, or at least not to continue driving in the at least one area 11 as the dwell time is too long and the at least one second vehicle 2 will then have to wait in queues and not perform efficient work. A user, e.g., driver, of the at least one second vehicle 2 may also regularly need breaks to work efficiently, and therefore the break for the user can be scheduled earlier in time to allow for the reason for the long dwell time to be resolved during the break, e.g., congestion in the at least one area 11 to be reduced, accidents causing the excessive dwell time to be resolved, etc.

Exemplary embodiments herein may be performed at least partly by a computer system 500, and/or a processor device 502 therein. The processor device 502 may be one or more processors, and/or any suitable processing circuitry. The computer system 500 may be comprised in any vehicle in the set of vehicles 3, e.g., the at least one first vehicle 1. The computer system 500 may also be comprised in a remote location communicatively coupled to the set of vehicles 3, e.g., the at least one first vehicle 1 and/or the at least one second vehicle 2. The computer system 500 may in some examples be comprised in a server or control station, e.g., which may be arranged to at least partly remotely control and/or to provide instructions to the at least one first vehicle 1 and/or the at least one second vehicle 2. The computer system 500 may alternatively be a distributed system, e.g., as part of multiple or all vehicles in the set of vehicles 3. The computer system 500 and/or the processor device 502 therein may further, directly and/or indirectly, control and/or communicate with any suitable entity comprised in the at least one first vehicle 1 and/or the at least one second vehicle 2, e.g., sensors and/or actuators of the at least one first vehicle 1 and/or the at least one second vehicle 2.

Figure 2:
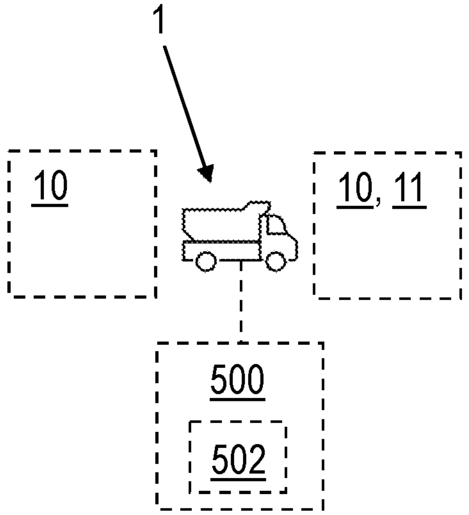
FIG. 2 is another view of FIG. 1, according to an example.

FIG. 2 is another view of FIG. 1, according to an example.

FIG. 2 illustrates the computer system 500 comprising the processor device 502 configured to notify of an excessive dwell time in the set of areas 10.

The processor device 502 is configured to obtain a dwell time for the at least one area 11. The dwell time is indicative of an actual time spent by the at least one first vehicle 1 in the at least one area 11. The set of areas including the at least one area 11 may be dynamically changing due to being clustered by positions of the set of vehicles 3 over time.

The processor device 502 is configured to, when the obtained dwell time exceeds an expected time by more than a threshold, notify at least one user and/or control unit associated with the set of vehicles 3 of that the dwell time exceeds the expected time by more than the threshold.

Figure 3:
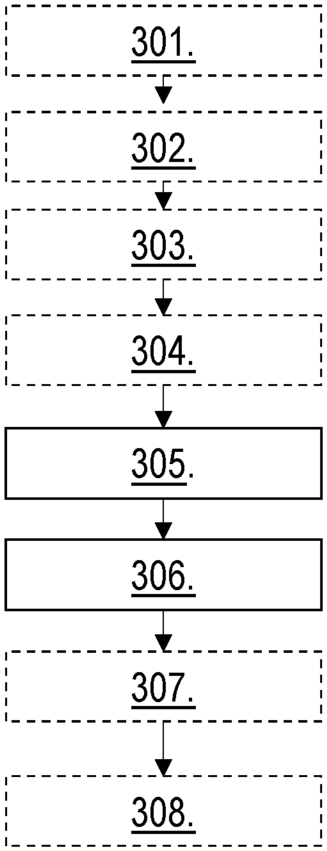
FIG. 3 is a flow chart of an exemplary method according to an example.

FIG. 3 is a flow chart of an exemplary computer-implemented method for notifying of an excessive dwell time in a set of areas 10. The method may comprise any one or more out of the following actions, which actions may be taken in any suitable order. Dashed boxes in FIG. 3 may illustrate optional actions.

Action 301.

The method may comprise, by the processor device 502 of the computer system 500, obtaining one or more first positions associated with one or more vehicles out of the set of vehicles 3 spending time over a predefined time limit within a respective location.

The respective location may be one out of one or more locations, such as a position or an area where the one or more vehicles out of the set of vehicles 3 have travelled. The one or more first positions may be GPS locations of a respective location, e.g., center location or where a respective vehicle has travelled in the respective location.

In some examples, obtaining the one or more first positions comprises detecting that the one or more vehicles out of the set of vehicles 3 have travelled more than a distance of a predefined diameter or with respect to a radius, and in response, determining if the one or more vehicles out of the set of vehicles 3 have spent more than the predefined time limit in a location corresponding to said diameter or radius. If so, a respective first position of the one or more first positions may correspond to a position of a vehicle of the set of vehicles as it travelled in the location. The respective first position may be a center position of the respective location.

In some examples obtaining the one or more first positions comprises detecting that the one or more vehicles out of the set of vehicles 3 is stopping and/or travelling slower than a set speed at. In these examples, the respective location may be a stopping position or area of the respective vehicle.

The one or more vehicles out of the set of vehicles 3 may be detected to stop if the respective vehicle is within a set radius of a respective location for at least the predefined time limit, e.g., within a radius such as 20 meters of a location for a set time such as 2 minutes. In other words, the one or more first positions may be where the set of vehicles 3 is performing work operations or are otherwise slowing down or are detected to stop for the predefined time limit.

In some examples, the one or more first positions are obtained during a moving time window. The moving time window may be a time period of a predefined duration and ranges from a previous point in time to a current point in time.

In other words, only positions which have most recently been detected are part of the one or more first positions.

The one or more first positions may additionally or alternatively be based one or more predefined locations, e.g., user-defined locations such as loading areas or loading bays, and the one or more first positions may then be at least partly detected by detecting the one or more first positions within a bounded area of the predefined locations.

Action 302.

The method may comprise determining the set of areas 10 is based on the one or more first positions. In this way, the set of areas 10 may be formed by detecting group of positions of the one or more first positions, where the set of vehicles 3 are stopping or driving slowly, i.e., meaning that these areas may be used for determining how long time vehicles area spending therein, such that anomalies with respect to dwell time in a respective area can be detected and handled accordingly.

The set of areas 10 may be determined such as to establish a convex hull around groups of positions of the one or more first positions which are within a set distance or radius of each other.

The set of areas 10 may be determined by a minimum number of positions.

In some examples, determining the set of areas 10 may be based on the one or more first positions by clustering the one or more first positions to form the set of areas 10.

The clustering method preferred for examples herein is DBSCAN, but any other suitable clustering method may also be used, e.g., k-means.

In some examples, clustering as used herein may be based on a minimum number of first positions e.g., as obtained in action 201, to form an area in the set of areas 10.

In some examples, clustering as used herein may be based on predefined constraints on adjacency distance or radius between the one or more first positions.

In some examples, determining the set of areas 10 comprises dynamically updating the set of areas 10 by any one or more out of:

establishing a new area in the set of areas 10, merging at least two areas in the set of areas 10, splitting an area into at least two areas in the set of areas 10, and deleting an area out of the set of areas 10.

Dynamically updating the set of areas 10 may be performed periodically e.g., every set time period such as once per hour.

Updating the set of areas 10 may comprise expanding or decreasing a size of a respective area in the set of areas 10, e.g., the at least one area 11. This is since the set of areas 10 may periodically or continuously be updated with new positions in the one or more first positions, e.g., as positions is detected where the set of vehicles 3 stops or travel below a set speed. Due to the moving time window, positions in the one or more first positions may expire, and if they are part of a respective area in the set of areas such as the at least one area, said respective area will adapt to not comprise the expired position, e.g., by reforming the respective area using any suitable clustering method.

Establishing a new area in the set of areas 10, may be performed by a number of establishing positions being detected as part of the one or more first positions, e.g., within the moving time window, such that the number of establishing positions are of a minimum number and are within a predefined distance or radius of each other, e.g., fulfilling a clustering condition. Furthermore, the number of establishing positions may not be part of, i.e., comprised in, any other area in the set of areas 10.

Merging at least two areas in the set of areas 10, may be performed by forming a new area out of positions part of two different areas, e.g., comprised in two different areas. This may be performed since a merging condition may have been reached between the two different areas, e.g., such that a minimum distance or radius between the two different areas have been exceeded by positions being added Splitting an area into at least two areas in the set of areas 10 may be performed if a splitting condition is reached, e.g., a position part of a part of the respective area may expire due to the moving time window, which further may mean that the area actually comprises a number of positions which on their own can form the two areas with a more than a distance or radius between the respective two areas.

Deleting an area out of the set of areas 10 may be performed if a deletion condition is reached, e.g., a position part of a part of the respective area may have expired due to the moving time window, which further may mean that the respective area no longer comprise a minimum number of positions needed to form an area.

Determining the set of areas 10 may comprise determining geofences for the set of areas 10. The geofences may be used for monitoring purposes, e.g., to monitor dwell time in the set of areas 10, e.g., upon entry and exit in the set of area 10.

The one or more first positions may or may not comprise one or more anomalies. This means that determining the set of areas 10 may leave some positions out of the one or more first positions to be not part of any of the set of areas 10.

Determining the set of areas 10 may comprise determining respective areas based on adjacency and/or distance and/or radius between the one or more first positions.

Determining the set of areas 10 may typically comprise forming polygons or convex hulls, e.g., based on DBSCAN clustering, but other shapes may also apply to examples herein. The polygons may be formed by following and/or aligning with respective positions, e.g., outer positions, of the positions forming an area in the set of areas 10.

Determining the set of areas 10 may further comprise, for each respective area, a respective buffer may be used. The respective buffer may be used to increase size of the respective area, e.g., to smoothen edges of the respective areas.

It shall be noted that for any examples herein, in particular relating to Action 301 and 302, any of the parameters relating to distances such as radiuses, diameters, and/or boundaries may be different or the same for each actions or context, may be predetermined, configured, selected and/or may be part of one or more input parameters. In particular, a distance/diameter/radius for detecting a stop, e.g., to obtain the stopping positions, i.e., the one or more first positions, of action 301, may be a separate distance from a radius/clustering distance used when clustering the stops, i.e., the one or more first positions.

Action 303.

The method may comprise establishing a time model, e.g., as discussed with respect to FIG. 1. The time model may indicate expected dwell times in the set of areas 10.

The time model may be established for a respective area in the set of areas 10 by obtaining one or more dwell times for the respective area and establishing the time model based on the obtained dwell times. The dwell times are respectively indicative of a time spent by one or more vehicles out of the set of vehicles in the respective area. In other words, The time model may be established by using geo-fences of the set of areas 10, to measure entry and exit times of the set of vehicles 3 in the set of areas 10 and using said entry and exit times to determine the respective dwell time.

The time model may indicate an expected time for a vehicle to spend in the set of areas 10.

In some examples, as an alternative, the time model may as an alternative to action 303, be predefined.

In some examples, in addition to or as an alternative to above, the time model may be determined based on stopping times of the set of vehicles 3 in the set of areas 10 or the timing and positioning information of when the set of vehicles 3 have travelled below a set speed threshold with respect to the set of areas 10, e.g., using the data of the one or more first positions as discussed in action 301.

Action 304.

The method comprises, by the processor device 502 of the computer system 500, obtaining from the time model for the set of areas 10, an expected time for at least one first vehicle 1 out of a set of vehicles 3 to spend in at least one area 11 out of the set of areas 10.

The time model may be any suitable model which can be used to obtain an expected time for the at least one first vehicle 1 to spend in the at least one area 11. The time model may be a trained machine learning model, e.g., as described with reference to FIG. 1.

In some examples, obtaining the expected time is performed by estimating the expected time by using the time model and based on any one or more out of the following input parameters:

- a type of the at least one first vehicle 1, e.g., any one or more out of: a transporting vehicle (rigid, trailer, concrete, asphalt), a loading vehicle, an excavator vehicle, e.g., of a certain type-dependent size and/or capacity, a wheel loader vehicle, e.g., of a certain type-dependent size and/or capacity, e.g., and wherein some types of vehicles may have different operating speeds,
- a current time period, e.g., any one or more out of a current date, a current weekday, and/or a current time, e.g., as the current time period may map to a current traffic/operation level in the at least one area 11,
- a type of at least one object and/or material handled by the at least one first vehicle 1 in the at least one area 11, e.g., some types of objects and/or materials may have different operating speed requirements, the type may as an example be any one or more out of clay, rock, cement, asphalt, sand, gravel, an expected time to load and/or unload the at least one first vehicle 1 in the at least one area 11, e.g., an equipment used for loading and/or unloading at the at least one area 11 may be associated with a time to load and/or unload, an expected mass and/or fill rate associated with the at least one area 11, e.g., where a low fill rate such as lower than a threshold may mean a fast loading time, and by that shorter dwell time, e.g., a low fill rate may mean that a model will indicate too optimistic dwell times but trucks may only be loaded to 70% of their capacity, a schedule for one or more operations to perform by the set of vehicles 3 in the at least one area 11, e.g., when the at least one first vehicle 1 is expected at different areas out of the at least one area 11, a drive plan of the at least one first vehicle 1, a number of vehicles of the set of vehicles 3 configured to at least partly operate in the set of areas 10, e.g., configured to at least partly operate in the at least one area 11, concurrently as the at least one first vehicle 1, wherein concurrently as used herein may mean that the number of vehicles are associated with vehicles that have a scheduled time to at least partly operate in the set of areas 10, e.g., the at least one area 11, which scheduled time overlap and/or have an associated error margin which overlap with a schedule of the at least one first vehicle 1, and a number of vehicles of the at least one first vehicle 1, e.g., as multiple vehicles in the at least one first vehicle 1 may lead to high congestion in the set of areas 10 which may increase the dwell time.

Action 305.

The method comprises, by the processor device 502, obtaining a dwell time for the at least one area 11. The dwell time is indicative of an actual time spent by the at least one first vehicle 1 in the at least one area 11. As an alternative, the dwell time is indicative of a predicted time to spend, by the at least one first vehicle 1 in the at least one area 11. When indicative of the actual time spent by the at least one first vehicle 1 in the at least one area 11, the dwell time may be measured by the at least one first vehicle 1. When indicative of the predicted time to spend by the at least one first vehicle 1 in the at least one area 11, the time to spend in the at least one area 11 may be predicted using the time model, e.g., in a similar manner to action 304, but using updated input parameters and/or partial measurements of time spent in the at least one area 11. In some examples, an increased number of vehicles may have been scheduled to operate, at least partially, in the at least one area 11 as compared to when obtaining the expected time in action 304.

The at least one area 11 may change over time, e.g., due to the moving time window and dynamically changing set of areas 10, and therefore the respective dwell time may change accordingly.

The dwell time may be measured by detecting entry and exit times of the set of vehicles 3 in geo-fences of the set of areas 10, such as in the at least one area 11.

In some examples, obtaining the dwell time of the at least one area 11 comprises any one out of:

receiving, from the at least one first vehicle 1, an actual time spent by the at least one first vehicle 1, when operating in the at least one area 11, or alternatively using the time model to predict the actual time for the at least one first vehicle 1 to spend in the at least one area 11.

When receiving the actual time spent by the at least one first vehicle 1, the actual time spent may have been measured by the at least one first vehicle 1. The at least one first vehicle 1 may detect some areas in the at least one area 11 by where the at least one first vehicle 1 stops, and may then record the time during the stop, e.g., loading areas and/or unloading areas.

When using the time model to predict the actual time for the at least one first vehicle 1 to spend in the at least one area 11, the actual time may be predicted by using the time model. The prediction may be the same as when obtaining the expected time in action 304, but at least some of the one or more input parameters may have changed and/or the prediction is made based on a partial time spent in the set of areas 10, e.g., where the actual time spent may be extrapolated from the partial time spent in the set of areas 10.

Additionally or alternatively, a first partial measurement of the at least one first vehicle 1 operating in the at least one area 11 may be used to extrapolate the time for the at least one first vehicle 1 to spend in the at least one area 11.

In some examples, some parameters have changed from predicting the expected time, the dwell time may be different—or if areas have been measured partially etc.

Predicting the time to spend by the at least one first vehicle 1 in the at least one area 11 may be performed in the same manner as obtaining the expected time using the time model, but input parameters to the time model may have changed.

Predicting the time to spend by the at least one first vehicle 1 in the at least one area 11 may in some examples further comprise obtaining an actual time spent in at least one area out of the at least one area 11 by at least one vehicle, e.g., other than the at least one first vehicle 1, in the set of vehicles 3.

Obtaining the dwell time of the at least one area 11 may be performed periodically, e.g., every set time period such as every minute or every second minute. Obtaining the dwell time the at least one area 11 may be performed at a higher frequency than updating the set of areas 10. In other words, the set of areas 10 may dynamically change which may cause a corresponding change in the respective dwell times. Dwell time of the set of areas may be measured, periodically updated, and further used according to examples herein.

Action 306.

The method comprises, by the processor device 502, when the obtained dwell time exceeds the expected time by more than a threshold, notifying at least one user and/or control unit associated with the set of vehicles 3 of that the dwell time exceeds the expected time by more than the threshold. In this way, the set of vehicles 3 can be better handled in view of the high dwell time of the at least one first vehicle 1, e.g., which may indicate that at least partly operating in the at least one area 11 will incur a high delay and/or a high degree of waiting/queueing/idling time for a vehicle and/or its user.

The expected time may be obtained using the time model and/or may be predefined or set using any suitable heuristics.

Notifying as used herein may mean to send a notification to the at least one user and/or control unit associated with the set of vehicles 3, e.g., over a wireless communications channel, any suitable form of notification such as by transmitting a signal and/or message, or by refraining from transmitting an expected signal and/or message.

In some examples, notifying the at least one user and/or control unit associated with the set of vehicles 3 of that the dwell time exceeds the expected time by more than the threshold comprises any one or more out of:

notifying a user and/or control unit of at least one second vehicle 2 out of the set of vehicles 3 of that the dwell time exceeds the expected time by more than the threshold, wherein the at least one second vehicle 2 is scheduled to operate in the at least one area 11, and notifying a dispatcher 20 of the set of vehicles 3 of that the dwell time exceeds the expected time by more than the threshold, wherein the dispatcher 20 is a user and/or control unit arranged to manage a schedule for the at least one second vehicle 2.

In other words, when the dwell time is excessive, the user and/or the control unit of the least one second vehicle 2, i.e., a driver or the vehicle itself, can be notified such that the control unit and/or the user of the least one second vehicle 2 can determine whether or not the least one second vehicle 2 shall operate in the at least one area 11, if a drive plan should be changed/aborted, and/or if a scheduled break for the user shall be rescheduled.

Notifying the at least one user and/or control unit associated with the set of vehicles 3 of that the dwell time exceeds the expected time by more than the threshold comprises any one or more out of:

notifying the at least one user and/or control unit of the obtained dwell time in the at least one area 11, and notifying the at least one user and/or control unit of a time difference between the expected time and the obtained dwell time.

In other words, the notification may comprise a total dwell time, or a difference between the dwell time and the expected time. The time difference may be used to establish how long a vehicle will have to wait extra for operating in the at least one area.

Furthermore, other time information may also be part of the notification, e.g., a time spend loading and/or unloading the at least one first vehicle 1.

In some examples notifying the dispatcher 20 of the set of vehicles 3 of that the dwell time exceeds the expected time by more than the threshold comprises notifying the dispatcher 20 that there are too many vehicles operating in, or scheduled to operate in, the set of areas 10, e.g., the at least one area 11. In some examples, the dispatcher 20 may then adjust the number of vehicles in the set of vehicles 3 operating in the set of areas 10. E.g., by calling one or more drivers of the set of vehicles 3, by issuing instructions for automated vehicles, and/or any other suitable action.

In some examples, notifying the dispatcher 20 of the set of vehicles 3 of that the dwell time exceeds the expected time by more than the threshold may trigger the dispatcher 20 to (re-)route and/or (re-)schedule at least one vehicle of the set of vehicles 3 to other areas than the at least one area 11, or to (re-)schedule at least one vehicle of the set of vehicles 3 to operate in the at least one area 11 at a different time.

As an alternative or as an additional example, when it is detected that the dwell time is shorter than the expected time by at least a threshold, the method may instead comprise notifying the dispatcher 20 of the set of vehicles 3 of that the dwell time is shorter than the expected time by more than a threshold. The method may then further comprise notifying the dispatcher 20 that there are too few vehicles operating in, or scheduled to operate in, the set of areas 10, e.g., the at least one area 11. In other words, for these scenarios, notifying the dispatcher 20 of the set of vehicles 3 of that the dwell time is shorter than the expected time by more than a threshold may trigger the dispatcher 20 to (re-)route and/or (re-)schedule at least one vehicle of the set of vehicles 3 to operate in the at least one area 11.

In some examples, notifying of that the dwell time exceeds the expected time by more than the threshold comprises triggering an adjustment, or an abort, of a drive plan of at least one second vehicle 2 out of the set of vehicles 3. In this way, the dwell time of the at least one area 11 will eventually go down as fewer vehicles operate therein, and furthermore, the at least one second vehicle can perform useful work instead of having to spend a lot of time waiting in the at least one area 11 due to the excessive dwell time.

Action 307.

In some examples, the method may comprise, by the processor device 502, guiding at least one second vehicle 2 out of the set of vehicles 3 in the set of areas 10, based on the estimated dwell time for the at least one area 11.

Guiding the at least one second vehicle 2 based on the dwell time may include indicating to the at least one second vehicle 2, or a user of the at least one second vehicle 2, where to drive, e.g., guiding the at least one second vehicle to one or more areas with a shorter dwell time, e.g., shorter than a threshold, and/or guiding the at least one second vehicle 2 to a designated rest area such that a driver of the at least one second vehicle 2 can take an earlier rest instead of having to queue during the excessive dwell time.

Action 308.

In some examples, the method may comprise, by the processor device 502, updating the time model based on the obtained dwell time. In some examples, when the time model is a machine learning model, the machine learning model may be trained as more dwell times are obtained for the at least one area 11 and/or the set of areas 10.

In some examples, updating the time model based on the obtained dwell time is performed in response to any one or more out of:

a predefined time and/or a periodic event, e.g., every completion of operations in the at least one area 11 and/or every set time period, a detected change of the set of areas 10, —obtaining an indication that a vehicle out of the set of vehicles 3 operates in an area not associated with the time model, e.g., areas in the set of areas 10 which have not been measured, and/or new areas/sub-areas where it is detected that a vehicle is stopping, detecting that the obtained dwell time for the at least one area 11 is greater than a threshold, e.g., when the dwell time is much different than the expected time, e.g., for a set number of consecutive times, and detecting that the obtained dwell time for the at least one area 11 is different from a previously estimated dwell time for the at least one area 11 by more than a threshold, e.g., for a set number of consecutive times.

Detecting a change of the set of areas 10 may relate to detecting any one or more out of:

one or more areas in the set of areas 10 change in size or position due to additions or deletions of positions in the respective one or more areas, one or more new areas in the set of areas 10 are established, one or more areas in the set of areas 10 are split, one or more areas in the set of areas 10 are merged, and one or more areas in the set of areas 10 are deleted, FIG. 4*a* illustrates a scenario according to an example. In the exemplary scenario of FIG. 4*a*, the set of areas 10 is exemplified. The set of areas 10 may comprise a first area

401 wherein the set of vehicles 3 are arranged to unload goods/materials/waste, e.g., onto unloading areas. In other words, the first area 401 may be a dump site. The first area 401 may comprise one or more first sub-areas 402, 403, 404. The one or more first sub-areas 402, 403, 404, may be specific unloading areas for where the set of vehicles 3 are arranged to perform unloading.

The set of areas 10 may further comprise a second area 407 wherein the set of vehicles 3 are arranged to load goods/materials, e.g., in certain loading areas. In other words, the second area 407 may be a loading site. The second area 407 may comprise one or more second sub-areas 408, 409, 410. The one or more second sub-areas 408, 409, 410 may comprise a loading area 410, wherein a loading vehicle 411 may load goods or materials onto a vehicle in the set of vehicles 3, e.g., the at least one first vehicle 1 and/or the at least one second vehicle 2. The loading area 410 may only load one vehicle at a time and may take a certain amount of time, e.g., referred to as loading time. While waiting for loading, the set of vehicles may queue in one or more queueing areas 408, 409.

The set of areas 10 may further comprise one or more roads 405, 406, wherein the set of vehicles 3 drive between areas in the set of areas 10, e.g., between the first area 401 and the second area 407.

In other words, the at least one area 11 described in examples and/or in embodiments herein may comprise any one or more out of the example areas in the example scenario of FIG. 4. In some examples, each vehicle in the set of vehicles 3 may be arranged, e.g., as one work iteration process, to travel to the loading area 410, wait for the respective vehicle to be loaded by the loading vehicle 411, and then travel to one of the one or more unloading areas, e.g., any of the one or more first sub-areas 402, 403, 404, to unload the respective vehicle. Each vehicle may have different schedules, e.g., time periods, and/or they may be scheduled to perform the work iteration process within a certain period of time after another vehicle.

In the example scenario of FIG. 4*a*, the at least one first vehicle 1 and the at least one second vehicle 2 may be any one or more out of the illustrated set of vehicles 3.

FIG. 4*b* illustrates an example scenario of how the set of areas 10 may be determined, e.g., as in action 302, according to an example. In FIG. 4*b*, the one or more first positions as discussed in examples herein is illustrated as groups of the one or more first positions 420, 421, 422, 423, and the set of areas 10 is illustrated as a first set of areas 430, a second set of areas 431, and a third set of areas 432.

The set of areas 10, 430, 431, 432 may be determined, e.g., as in actions 302.

The one or more first positions 420, 421, 422, 423 may have been detected based on positions of the set of vehicles 3, e.g., using GPS or GNSS coordinates or using any other suitable manner of determining the respective vehicle position, with regards to the moving time window. Using a clustering method, e.g., a convex hull clustering method such as DBSCAN, the first set of areas 430, a second set of areas 431, and a third set of areas 432 is determined, e.g., as part of action 202.

The one or more first positions 420, 421, 422, 423 may comprise an anomaly group 423 which indicates positions not forming part of an area in the set of areas 10, e.g., as they are not sufficiently close to a sufficient number or positions of the one or more first positions 420, 421, 422, 423.

Due to the moving time window causing new positions in the one or more first positions 420, 421, 422, 423 to be added, and old expired ones to be removed, the set of areas 10, 430, 431, 432 as illustrated in FIG. 4*b* may over time change in size, be split, new areas may be established, and some areas may merge or may be deleted.

Dwell times may be periodically or continuously measured for the set of vehicles 3 in the set of areas 10, 430, 431, 432 as they dynamically change, such that when obtained dwell time for the at least one area 11 exceeds the expected time by more than a threshold, the at least one user and/or the control unit associated with the set of vehicles 3 can be notified of that the dwell time exceeds the expected time by more than the threshold.

FIG. 4*c* illustrates an scenario of how the one or more first positions 420, 421, 422, 423 may be determined, e.g., as in action 301, and accordingly how the set of areas 10 may be determined. and how the, e.g., as in action 302. FIG. 4*c* illustrates respective locations 420*a*, 420*b*, 420*c*, 420*d*, which locations may be determined as part of action 201.

The respective locations 420*a*, 420*b*, 420*c*, 420*d* may be dynamically detected by detecting that the set of vehicles 3 operate within such locations. Each respective location 420*a*, 420*b*, 420*c*, 420*d* may be associated with a predefined radius r. The predefined radius may be set to account for GPS noise. The respective locations 420*a*, 420*b*, 420*c*, 420*d* may be determined by detecting that a respective vehicle in the set of vehicles 3 is spending a least the predefined time limit within one of the respective locations 420*a*, 420*b*, 420*c*, 420*d*. In some examples, a respective location 420*a*, 420*b*, 420*c*, 420*d* may be detected when the respective vehicle travels a predefined distance associated with the predefined radius, such as a predefined diameter, indicating that the respective vehicle has travelled an area associated with the radius. The location may then be detected as part of the respective locations 420*a*, 420*b*, 420*c*, 420*d* under the condition that it spent are least the predefined time limit therein.

The one or more first positions 420, 421, 422, 423 may be determined as center locations of the respective locations, 420*a*, 420*b*, 420*c*, 420*d*, or any other suitable position therein.

The one or more first positions 420, 421, 422, 423 that are clustered within a predefined distance or radius of each other may be clustered into an area in the set of areas 10, such as the first set of areas 430. The anomaly position 423 may not be clustered into any area as it may be too far away to any other position.

Further Variations and Examples

In some examples, methods herein may further comprise detecting new time factors such as any one or more out of maneuvering time, queuing time, and waiting time indicated by that the set of vehicles 3 standing still and not moving, e.g., in the at least one area 11. If the waiting time exceeds what is considered as a normal waiting time, e.g., a predefined waiting time, a time record is created to indicate the excess waiting time for the respective vehicle.

In some examples, the dispatcher 20 is notified that there is an ongoing waste, e.g., excessive dwell time, e.g., in the at least one area 11.

In some examples, a waiting time record may further be created. A driver of a vehicle with excess waiting time may then enter the cause of the waiting time. A time record may in some examples further be provided automatically for a driver, e.g., if indicated that the vehicle of the driver has excessive dwell time such that the driver gets paid for waiting time more than a normal dwell time in the at least one area 11.

In some examples, methods herein may further comprise indicating too many trucks in the work iteration process, thereby causing a waiting time and/or long dwell time. The dispatcher 20 or any other suitable user/control unit may be triggered to remove one vehicle in the set of vehicles 3 from operating in the at least one area 11. Low terminal times and/or dwell time, without no excess waiting time may indicate a possibility to add an extra vehicle in the set of vehicles 3 to the work iteration process. The dispatcher 20 or any other suitable user/control unit may be triggered to add one vehicle in the set of vehicles 3 to operate in the at least one area 11.

In some examples, methods herein may further comprise proactively notifying the dispatcher 20 when too many vehicles in the set of vehicles 3 approaching the set of areas 10, e.g., the at least one area 11, where a high risk for too many vehicles in the set of areas 10, e.g., the at least one area 11, at the same, i.e. a high risk for an excessive dwell time, e.g., longer than an expected time by more than a threshold. This allows the dispatcher 20 to take action before many vehicles in the set of vehicles 3 are standing still queuing in the set of areas 10.

Figure 5:
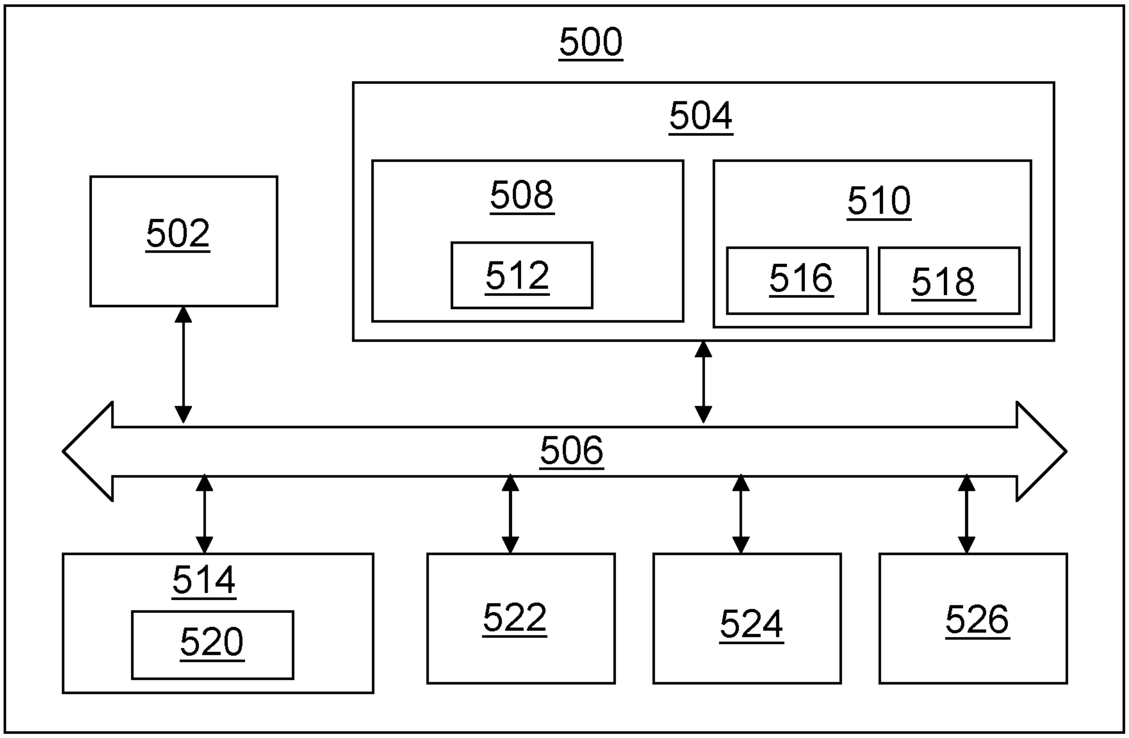
FIG. 5 is a schematic diagram of an exemplary computer system for implementing examples disclosed herein, according to an example.

FIG. 5 is a schematic diagram of the computer system 500 for implementing examples disclosed herein. The computer system 500 is adapted to execute instructions from a computer-readable medium to perform these and/or any of the functions or processing described herein. The computer system 500 may be connected (e.g., networked) to other machines in a LAN, an intranet, an extranet, or the Internet. While only a single device is illustrated, the computer system 500 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processing circuitry, processor device, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 500 may comprise at least one computing device or electronic device capable of including firmware, hardware, and/or executing software instructions to implement the functionality described herein. The computer system 500 may include the processor device 502. The processor device may be a processor or processing circuitry, e.g., processing circuitry including one or more processor devices or control units, (may also be referred to as a control unit), a memory 504, and a system bus 506. The computer system 500 may include at least one computing device having the processor device 502. The system bus 506 provides an interface for system components including, but not limited to, the memory 504 and the processor device 502. The processor device 502 may include any number of hardware components for conducting data or signal processing or for executing computer code stored in memory 504. The processor device 502 (e.g., control unit) may for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processor device may further include computer executable code that controls operation of the programmable device.

The system bus 506 may be any of several types of bus structures that may further interconnect to a memory bus (with or without a memory controller), a peripheral bus, and/or a local bus using any of a variety of bus architectures. The memory 504 may be one or more devices for storing data and/or computer code for completing or facilitating methods described herein. The memory 504 may include database components, object code components, script components, or other types of information structure for supporting the various activities herein. Any distributed or local memory device may be utilized with the systems and methods of this description. The memory 504 may be communicably connected to the processor device 502 (e.g., via a circuit or any other wired, wireless, or network connection) and may include computer code for executing one or more processes described herein. The memory 504 may include non-volatile memory 508 (e.g., read-only memory (ROM), erasable programmable read-only memory (EPROM), electrically erasable programmable read-only memory (EEPROM), etc.), and volatile memory 510 (e.g., random-access memory (RAM)), or any other medium which can be used to carry or store desired program code in the form of machine-executable instructions or data structures and which can be accessed by a computer or other machine with a processor device 502. A basic input/output system (BIOS) 512 may be stored in the non-volatile memory 508 and can include the basic routines that help to transfer information between elements within the computer system 500.

The computer system 500 may further include or be coupled to a non-transitory computer-readable storage medium such as the storage device 514, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 514 and other drives associated with computer-readable media and computer-usable media may provide non-volatile storage of data, data structures, computer-executable instructions, and the like.

Computer-code which is hard or soft coded may be provided in the form of one or more modules. The module(s) can be implemented as software and/or hard-coded in circuitry to implement the functionality described herein in whole or in part. The modules may be stored in the storage device 514 and/or in the volatile memory 510, which may include an operating system 516 and/or one or more program modules 518. All or a portion of the examples disclosed herein may be implemented as a computer program product 520 stored on a transitory or non-transitory computer-usable or computer-readable storage medium (e.g., single medium or multiple media), such as the storage device 514, which includes complex programming instructions (e.g., complex computer-readable program code) to cause the processor device 502 to carry out the actions described herein. Thus, the computer-readable program code of the computer program 520 can comprise software instructions for implementing the functionality of the examples described herein when executed by the processor device 502.

In some examples, the storage device 514 may be a computer program product (e.g., readable storage medium) storing the computer program 520 thereon, where at least a portion of a computer program 520 may be loadable (e.g., into a processor) for implementing the functionality of the examples described herein when executed by the processing circuitry 502.

The processor device 502 may serve as a controller or control system for the computer system 500 that is to implement the functionality described herein.

The computer system 500 also may include an input device interface 522 (e.g., input device interface and/or output device interface). The input device interface 522 may be configured to receive input and selections to be communicated to the computer system 500 when executing instructions, such as from a keyboard, mouse, touch-sensitive surface, etc. Such input devices may be connected to the processor device 502 through the input device interface 522 coupled to the system bus 506 but can be connected through other interfaces such as a parallel port, an Institute of Electrical and Electronic Engineers (IEEE) 1394 serial port, a Universal Serial Bus (USB) port, an IR interface, and the like. The computer system 500 may include an output device interface 524 configured to forward output, such as to a display, a video display unit (e.g., a liquid crystal display (LCD) or a cathode ray tube (CRT)). The computer system 500 may include a communications interface 526 suitable for communicating with a network as appropriate or desired.

The operational actions described in any of the exemplary aspects herein are described to provide examples and discussion. The actions may be performed by hardware components, may be embodied in machine-executable instructions to cause a processor to perform the actions, or may be performed by a combination of hardware and software. Although a specific order of method actions may be shown or described, the order of the actions may differ. In addition, two or more actions may be performed concurrently or with partial concurrence.

Below follows examples which each individually or combined can be combined with and/or replace any one or more above-mentioned aspects and/or examples.

Example 1. A computer-implemented method for notifying of an excessive dwell time in a set of areas 10, comprising any one or more out of the following features, in any suitable order:

- by a processor device 502 of a computer system 500, obtaining 301 one or more first positions 420, 421, 422, 423 associated with one or more vehicles out of a set of vehicles 3 spending time over a predefined time limit within a respective location 420*a*, 420*b*, 420*c*,
- by a processor device 502 of a computer system 500, determining 302 the set of areas 10 based on the one or more first positions 420, 421, 422, 423,
- by a processor device 502 of a computer system 500, obtaining from a time model for the set of areas 10, an expected time for at least one first vehicle 1 out of a set of vehicles 3 to spend in at least one area 11 out of the set of areas 10,
- by the processor device 502, obtaining a dwell time for the at least one area 11, the dwell time being indicative of an actual time spent, or a predicted time to spend, by the at least one first vehicle 1 in the at least one area 11, and
- by the processor device 502, when the obtained dwell time exceeds an expected time e.g., predefined or defined by the time model, by more than a threshold, notifying at least one user and/or control unit associated with the set of vehicles 3 of that the dwell time exceeds the expected time by more than the threshold.

Example 2. A computer system 500 comprising a processor device 502 configured to notify of an excessive dwell time in a set of areas 10, the processor device 502 being configured to any one or more out of the following features in any suitable order:

- obtain one or more first positions 420, 421, 422, 423 associated with one or more vehicles out of a set of vehicles 3 spending time over a predefined time limit within a respective location 420*a*, 420*b*, 420*c*, and determine the set of areas 10 based on the one or more first positions 420, 421, 422, 423,
- obtain from a time model for the set of areas 10, an expected time for at least one first vehicle 1 out of a set of vehicles 3 to spend in at least one area 11 out of the set of areas 10,
- obtain a dwell time for the at least one area 11, the dwell time being indicative of an actual time spent, or a predicted time to spend, by the at least one first vehicle 1 in the at least one area 11, and
- when the obtained dwell time exceeds an expected time, e.g., predefined or defined by the time model, by more than a threshold, notify at least one user and/or control unit associated with the set of vehicles 3 of that the dwell time exceeds the expected time by more than the threshold.

Example 3. The system of example 2, wherein obtaining the expected time is performed by estimating the expected time by using the time model and based on any one or more out of the following input parameters:

- a type of the at least one first vehicle 1,
  - a current time period, e.g., any one or more out of a current date, a current weekday, and/or a current time,
- a type of at least one object and/or material handled by the at least one first vehicle 1 in the at least one area 11,
- an expected time to load and/or unload the at least one first vehicle 1 in the at least one area 11,
- an expected mass and/or fill rate associated with the at least one area 11,
- a schedule for one or more operations to perform by the set of vehicles 3 in the at least one area 11
- a drive plan of the at least one first vehicle 1,
- a number of vehicles of the set of vehicles 3 configured to at least partly operate in the set of areas 10 concurrently as the at least one first vehicle 1,
- a number of vehicles of the at least one first vehicle 1.

Example 4. The system of any one of examples 2-3, wherein notifying the at least one user and/or control unit associated with the set of vehicles 3 of that the dwell time exceeds the expected time by more than the threshold comprises:

- notifying a user and/or control unit of at least one second vehicle 2 out of the set of vehicles 3 of that the dwell time exceeds the expected time by more than the threshold, wherein the at least one second vehicle 2 is scheduled to operate in the at least one area 11.

Example 5. The system of any one of examples 2-3, wherein notifying the at least one user and/or control unit associated with the set of vehicles 3 of that the dwell time exceeds the expected time by more than the threshold comprises:

notifying a dispatcher 20 of the set of vehicles 3 of that the dwell time exceeds the expected time by more than the threshold, wherein the dispatcher 20 is a user and/or control unit arranged to manage a schedule for the at least one second vehicle 2.

Example 6. The system of any one of examples 2-5, wherein notifying the at least one user and/or control unit associated with the set of vehicles 3 of that the dwell time exceeds the expected time by more than the threshold comprises:

notifying the at least one user and/or control unit of the obtained dwell time in the at least one area 11.

Example 7. The system of any one of examples 2-6, wherein notifying the at least one user and/or control unit associated with the set of vehicles 3 of that the dwell time exceeds the expected time by more than the threshold comprises:

notifying the at least one user and/or control unit of a time difference between the expected time and the obtained dwell time.

Example 8. The system of any one of examples 4-7, wherein notifying the dispatcher 20 of the set of vehicles 3 of that the dwell time exceeds the expected time by more than the threshold comprises notifying the dispatcher 20 that there are too many vehicles operating in, or scheduled to operate in, the set of areas 10.

Example 9. The system of any one of examples 2-8, wherein obtaining the dwell time of the at least one area 11 comprises:

receiving, from the at least one first vehicle 1, an actual time spent by the at least one first vehicle 1, when operating in the at least one area 11.

Example 10. The system of any one of examples 2-8, wherein obtaining the dwell time of the at least one area 11 comprises:

using the time model to predict the actual time for the at least one first vehicle 1 to spend in the at least one area 11.

Example 11. The system of any one of examples 2-7, further comprising, by the processor device 502, updating the time model based on the obtained dwell time.

Example 12. The system of example 11, wherein updating the time model based on the obtained dwell time is performed in response to a predefined time and/or a periodic event.

Example 13. The system of examples 11-12, wherein updating the time model based on the obtained dwell time is performed in response to obtaining an indication that a vehicle out of the set of vehicles 3 operates in an area not associated with the time model.

Example 14. The system of examples 11-13, wherein updating the time model based on the obtained dwell time is performed in response to any one or more out of:

detecting that the obtained dwell time for the at least one area 11 is greater than a threshold, and detecting that the obtained dwell time for the at least one area 11 is different from a previously estimated dwell time for the at least one area 11 by more than a threshold.

Example 15. The system of any one of examples 2-14, wherein notifying of that the dwell time exceeds the expected time by more than the threshold comprises triggering an adjustment, or an abort, of a drive plan of at least one second vehicle 2 out of the set of vehicles 3.

Example 16. The system of any one of examples 2-10, wherein the method further comprises:

by the processor device 502, guiding at least one second vehicle 2 out of the set of vehicles 3 in the set of areas 10, based on the estimated dwell time for the at least one area 11.

Example 17. The method of example 1, or the system of any one of examples 2-16, wherein the processor device 502 is a processing circuitry.

Example 18. A vehicle comprising a processor device 502 to perform the method of example 1 or the steps performed by the system in any of examples 2-16.

Example 19. A computer program product 520 comprising program code for performing, when executed by a processor device 502, the method of example 1 or the steps performed by the system in any of examples 2-16.

Example 20. A control system comprising one or more control units configured to perform the method of example 1 or the steps performed by the system in any of examples 2-16.

Example 21. A non-transitory computer-readable storage medium 514 comprising instructions, which when executed by a processor device 502, cause the processor device to perform the method of example 1 or the steps performed by the system in any of examples 2-16.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, actions, operations, elements, and/or components, but do not preclude the presence or addition of one or more other features, integers, steps, actions, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

Furthermore, even if not explicitly stated for each of the above-mentioned example and/or embodiment, any one or more out of the above-mentioned examples and/or embodiments may be combined in any suitable manner.

What is claimed is:

1. A computer system comprising a processor device configured to notify of an excessive dwell time in a set of areas, the processor device being configured to:

obtain one or more first positions associated with one or more vehicles out of a set of vehicles spending time over a predefined time limit within a respective location, wherein the one or more first positions are obtained during a moving time window that ranges from a previous point in time to a current point in time, and wherein first positions expire by being removed from the one or more first positions when outside the moving time window, dynamically determine, by clustering the obtained one or more first positions, the set of areas based on the one or more first positions, wherein dynamically determining comprises reforming the set of areas by re-clustering at least the non-expired first positions in response to expiration of one or more first positions, obtain a dwell time for the at least one area out of the set of areas, the dwell time being indicative of an actual time spent by the at least one first vehicle in the at least one area, when the obtained dwell time exceeds an expected time by more than a threshold, notify at least one user and/or control unit associated with the set of vehicles of that the dwell time exceeds the expected time by more than the threshold.

2. A computer-implemented method for notifying of an excessive dwell time in a set of areas, comprising:

obtaining, by a processor device of a computer system, one or more first positions associated with one or more vehicles out of a set of vehicles spending time over a predefined time limit within a respective location, wherein the one or more first positions are obtained during a moving time window that ranges from a previous point in time to a current point in time, and wherein first positions expire by being removed from the one or more first positions when outside the moving time window, dynamically determining, by clustering the obtained one or more first positions, the set of areas based on the one or more first positions, wherein dynamically determining comprises reforming the set of areas by re-clustering at least the non-expired first positions in response to expiration of one or more first positions, by the processor device, obtaining a dwell time for the at least one area, the dwell time being indicative of an actual time spent, by the at least one first vehicle in the at least one area, by the processor device, when the obtained dwell time exceeds an expected time by more than a threshold, notifying at least one user and/or control unit associated with the set of vehicles of that the dwell time exceeds the expected time by more than the threshold.

3. The method of claim 2, wherein obtaining the one or more first positions comprises detecting that the one or more vehicles out of the set of vehicles have spent over the predefined time limit within a respective radius associated with the respective location.

4. The method of claim 2, wherein notifying the at least one user and/or control unit associated with the set of vehicles of that the dwell time exceeds the expected time by more than the threshold comprises any one or more out of:

notifying a user and/or control unit of at least one second vehicle out of the set of vehicles of that the dwell time exceeds the expected time by more than the threshold, wherein the at least one second vehicle is scheduled to operate in the at least one area, and notifying a dispatcher of the set of vehicles of that the dwell time exceeds the expected time by more than the threshold, wherein the dispatcher is a user and/or control unit arranged to manage a schedule for the at least one second vehicle.

5. The method of claim 2, wherein notifying the at least one user and/or control unit associated with the set of vehicles of that the dwell time exceeds the expected time by more than the threshold comprises any one or more out of:

notifying the at least one user and/or control unit of the obtained dwell time in the at least one area, and notifying the at least one user and/or control unit of a time difference between the expected time and the obtained dwell time; and optionally, notifying the dispatcher of the set of vehicles of that the dwell time exceeds the expected time by more than the threshold comprises notifying the dispatcher that there are too many vehicles operating in, or scheduled to operate in, the set of areas.

6. The method of claim 2, wherein obtaining the dwell time of the at least one area comprises receiving, from the at least one first vehicle, an actual time spent by the at least one first vehicle, when operating in the at least one area.

7. The method of claim 2, wherein the one or more first positions are obtained during a moving time window, wherein the moving time window is a time period of a predefined duration and ranges from a previous point in time to a current point in time.

8. The method of claim 2, wherein determining the set of areas comprises dynamically updating the set of areas by any one or more out of:

establishing a new area in the set of areas, merging at least two areas in the set of areas, splitting an area into at least two areas in the set of areas, and deleting an area out of the set of areas.

9. The method of claim 2, wherein the method further comprises:

by a processor device of a computer system, obtaining from a time model for the set of areas, the expected time for at least one first vehicle out of a set of vehicles to spend in at least one area out of the set of areas, and optionally wherein the method comprising:

by the processor device, updating the time model based on the obtained dwell time, and wherein updating the time model based on the obtained dwell time is performed in response to any one or more out of:

a detected change of the set of areas, a predefined time and/or a periodic event, obtaining an indication that a vehicle out of the set of vehicles operates in an area not associated with the time model, detecting that the obtained dwell time for the at least one area is greater than a threshold, and detecting that the obtained dwell time for the at least one area is different from a previously estimated dwell time for the at least one area by more than a threshold.

10. The method of claim 9, wherein the method further comprises establishing the time model for a respective area in the set of areas, by obtaining one or more dwell times for the respective area, and establishing the time model based on the obtained dwell times, wherein the dwell times are respectively indicative of a time spent by one or more vehicles out of the set of vehicles in the respective area.

11. A vehicle comprising a processor device to perform the method of claim 2.

12. A control system comprising one or more control units configured to perform the method of claim 2.

13. A non-transitory computer-readable storage medium comprising instructions, which when executed by a processor device, cause the processor device to perform the method of claim 2.

* * * * *